United States Patent
Zinelli

(10) Patent No.: US 6,500,383 B2
(45) Date of Patent: Dec. 31, 2002

(54) TAPPING TOOL

(75) Inventor: Raffaele Zinelli, Parma (IT)

(73) Assignee: PI.EFFE.CI DEI F.LLI Vernasca E C. S.N.C. (IT)

( * ) Notice: Subject to any disclaimer, the term of this patent is extended or adjusted under 35 U.S.C. 154(b) by 0 days.

(21) Appl. No.: 09/785,265

(22) Filed: Feb. 20, 2001

(65) Prior Publication Data

US 2001/0035599 A1 Nov. 1, 2001

(30) Foreign Application Priority Data

Feb. 28, 2000 (IT) .......................................... RE00A0013

(51) Int. Cl.[7] ................................................. B23B 27/10
(52) U.S. Cl. .............................. 266/271; 408/57; 408/59
(58) Field of Search ..................... 266/271, 48; 408/57, 408/59, 222, 217, 218, 226

(56) References Cited

U.S. PATENT DOCUMENTS

| | | | | |
|---|---|---|---|---|
| 4,762,444 A | * | 8/1988 | Mena ........................... | 408/59 |
| 5,152,642 A | * | 10/1992 | Pitts et al. ................... | 408/226 |
| 5,234,293 A | * | 8/1993 | Mena ........................... | 408/57 |
| 5,993,120 A | * | 11/1999 | Giessler ....................... | 408/59 |

* cited by examiner

Primary Examiner—Scott Kastler
(74) Attorney, Agent, or Firm—Browdy and Neimark, P.L.L.C.

(57) ABSTRACT

A tapping tool comprises a threaded portion and an upper gripping shank, and presents an axial bore which has its base wall proximate to the end of the threaded portion and opens at the end of the shank, there being present in proximity to the base wall at least one duct which connects the bore to the outer surface of the threaded portion, and makes available on one side of the outer rim of the duct a sharp edge for removing the material, which then by passing through said duct collects inside the bore.

12 Claims, 1 Drawing Sheet

TAPPING TOOL

FIELD OF THE INVENTION

This invention relates to those tools known as screw taps, used to create or regenerate a female thread. In particular, the invention relates to those tapping devices used to regenerate female threads located in positions in which any fall of cutting swarf is undesirable.

Tapping tools of known type generally consist of a screw portion interrupted by cuts or grooves for escape of the swarf. Said grooves, which are equidistant, are directed along the screw axis, or extend helically along the outer surface of the screw.

Although the known devices perfectly satisfy the purpose for which they are proposed, under certain operating conditions they present drawbacks. For example, while regenerating the thread of the seat for a spark plug, it can happen that the swarf falls into the combustion chamber, from which it must be removed to prevent damage to the engine. The same happens when regenerating for example the Lambda probe of catalytic exhaust systems. Again in this case considerable care must be taken, because even a single shaving can irremediably damage the catalyst.

Currently, when the operator has to carry out one of the described operations he is compelled to use expedients, such as to spread solid lubricant on the surface of the screw tap in the hope that the swarf remains attached to it. Another expedient used is to insert rags into the hole to be threaded or rethreaded.

SUMMARY OF THE INVENTION

The object of the present invention is to overcome the drawbacks of the known art, within the context of a rational and reliable solution which dispenses with the need for the use of any expedient by the operator.

The invention attains said object by means of a tapping tool comprising a threaded portion and an upper gripping portion or shank, and is provided with an axial dead bore which has its base wall proximate to the lower end of said threaded portion and opens to the outside at the upper surface of said shank. In said threaded portion there is present at least one duct arranged to connect said axial dead bore to the threaded portion, the axis of said at least one duct being inclined to the radius of said screw portion, both to enable a sharp edge to be formed on one side of the rim of said at least one duct, and to enable the swarf to roll into the dead bore of the tool.

At the lower end of said threaded portion there is present a cylindrical nosepiece which enables the tool to be easily centered within the hole to be threaded and consequently to execute correct rethreading (or tapping) perpendicular to the hole.

The tool of the invention can be provided with a ring nut to act as a reference element for the depth of the thread. A locking nut is preferably associated with said ring nut.

Said ring nut also preferably presents a flat surface on one side, and on the other side an inclined surface which matches the sealing surface present on the spark plug intended for the hole being threaded.

In a variant of the invention, the cavity of said gripping shank is threaded and constitutes a screw die for the outer surface of the shank for example of the spark plug.

Obviously in this case the sharp edge consists of at least one inclined hole arranged to expel the cutting swarf to the outside.

The constructional and operational characteristics of the invention will be more apparent from the ensuing description of a preferred embodiment thereof given by way of non-limiting example and illustrated in the accompanying drawings.

DESCRIPTION OF THE PREFERRED EMBODIMENT

Figure 1:
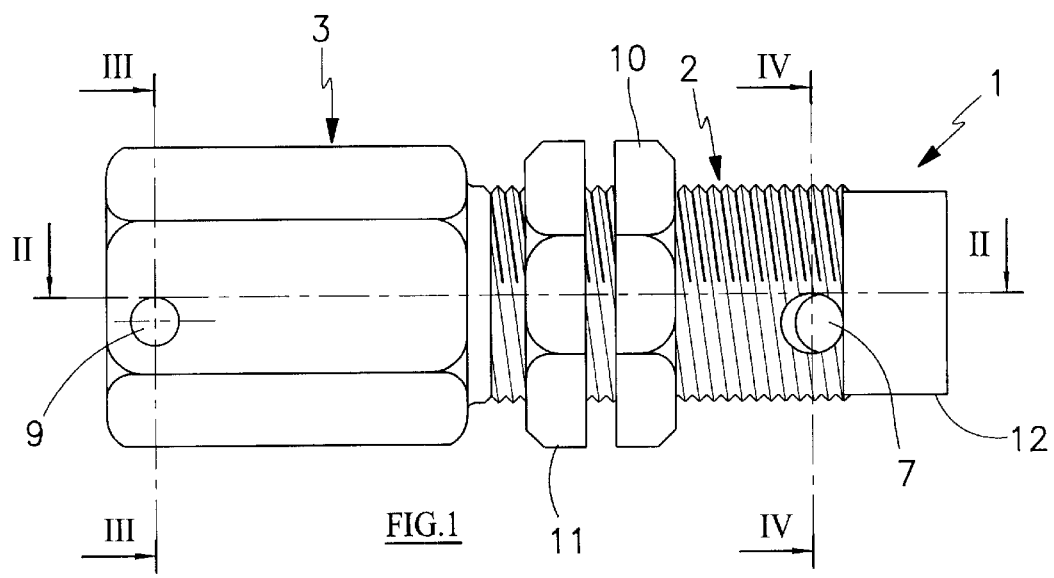
FIG. 1 is a side view of the invention.
Figure 2:
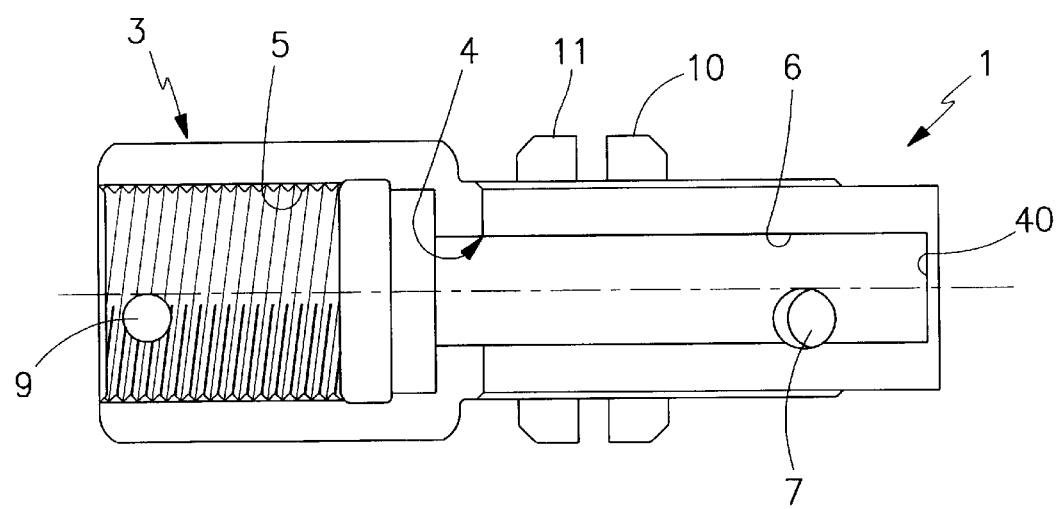
FIG. 2 is a section on the line II—II of FIG. 1.
Figures 3, 4:
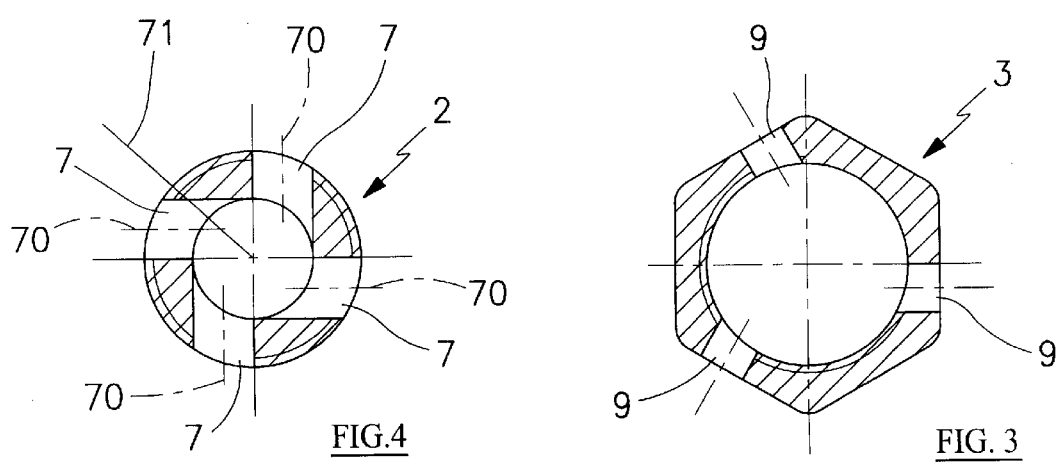
FIG. 3 is a section on the line III—III of FIG. 1.
FIG. 4 is a section on the line IV—IV of FIG. 1.

The said figures show the tool 1, which presents a threaded portion 2 (or screw tap), and an upper gripping shank 3. The tool 1 is provided with an axial bore of different sections 5 and 6, the base wall 40 of which is proximate to the lower end of said threaded portion, and which opens to the outside at the end of said shank 3.

In proximity to said end wall 40, the tool 1 is provided with four identical equidistant ducts 7 which connect the threaded portion 2 to the dead hole 4. The axis 70 of the ducts 7 is inclined to the radius of the threaded portion 2, both to enable a sharp edge to be formed on one side of the rim of said ducts 7, and to facilitate entry of the cutting swarf into the bore 4. That portion of the bore along the section 5 is threaded to form a screw die 8 of the same size and pitch as the threaded portion 2, which constitutes the screw tap. In this case the cutting swarf is expelled to the outside by virtue of three identical ducts 9. Again in this case the axis of said ducts 9 is inclined to the radius of the screw die 8, both to enable a sharp edge to be formed on one side of the rim of said ducts 9, and to facilitate expulsion of the cutting swarf to the outside.

In the illustrated embodiment, the outer surface of the shank 3 is hexagonal to enable the tool 1 to be fitted to a usual wrench.

Onto the threaded portion 2 of the tool 1 there are screwed a ring nut 10 and a nut 11 for locking the ring nut 10. The ring nut 10 enables the depth of the thread to be set; this is advantageous in those cases in which it is important to monitor said depth in order not to damage devices which lie below the hole to be rethreaded, such as when rethreading the seat for a spark plug.

The ring nut 10 also presents a flat surface on one side, and on the opposite side a conical surface which matches the sealing surface present on the spark plug. When rethreading a hole in which a spark plug with a sealing surface having a flat washer is to be mounted, the ring nut 10 is screwed with its flat side facing the hole, whereas if the spark plug has a conical sealing surface, the ring nut 10 is screwed with its conical surface facing the hole to be rethreaded.

Finally, it should be noted that the lower end of the threaded portion 2 presents a cylindrical nosepiece 12 the purpose of which is to facilitate centering of the tool 1 within the hole to be rethreaded, this resulting in correct tapping perpendicular to the hole.

The operation of the invention is very simple. To rethread a hole, for example the seat for a spark plug, the ring nut 10 is positioned at the required level and locked in position by the nut 11.

The tool 1 is then screwed into the hole to achieve tapping or threading. During this operation the cutting swarf is collected inside the bore 4 by passing through the ducts 7. After tapping, said swarf can be drawn off by simply inserting a tube into the bore 4 and withdrawing the material by a usual suction device.

What is claimed is:

1. A tapping tool having a lower end and an upper end and comprising a threaded portion (2) having an outer threaded cylindrical surface and an upper gripping shank (3), characterised by presenting a blind axial bore (4) that is closed at said lower end and opens at said upper end, there being present in said threaded portion at least one duct (7) connected to said bore (4), having a mouth which opens directly on said outer surface of said threaded portion (2), said mouth having an outer rim wholly formed by the intersection of the duct (7) with the outer threaded cylindrical surface of the threaded portion (2), one side of said outer rim forming a sharp edge for removing the material, which then by passing through said duct (7) collects inside said bore (4), wherein said outer rim of said mouth constitutes the sole means for cutting the material and when said tool is in operation, said bore does not contain any liquid.

2. A tool as claimed in claim 1, characterised in that the axis (70) of said at least one duct (7) is not radial.

3. A tool as claimed in claim 1, characterised in that four equidistant identical ducts (7) are present in said threaded portion (2).

4. A tool as claimed in claim 1, characterised in that said bore (4) presents two different sections (5, 6).

5. A tool as claimed in claim 1, characterised in that that portion of the bore (4) within said shank (3) is threaded and forms a screw die (8).

6. A tool as claimed in claim 5, characterised in that said screw die (8) comprises at least one duct (9) which connects said die (8) to the outer surface of said shank (3).

7. A tool as claimed in claim 6, characterised in that the axis of said at least one duct is not radial.

8. A tool as claimed in claim 6, characterised in that said die (8) comprises three equidistant ducts (9).

9. A tool as claimed in claim 1, characterised in that on said threaded portion there are screwed a ring nut (10) and a nut (11) acting as a locking nut to lock the, ring nut (10) in the desired position.

10. A tool as claimed in claim 9, characterised in that said ring nut presents a flat surface on one side, and a conical surface on the other side.

11. A tool as claimed in claim 1, characterised in that a cylindrical nosepiece is present at the end of said threaded portion (2).

12. A screw die having an inner cylindrical surface delimiting an axial bore and an outer surface, said die having a female thread on said inner cylindrical surface for cutting a male thread on a workpiece and at least one duct that extends between said female thread and said outer surface, said duct having an inner end that intersects said female thread and forms with said female thread a sharp edge for removing material that is cut from the workpiece during cutting of the male thread and allowing material that has been cut to be conveyed along said duct toward said outer surface.

\* \* \* \* \*